Sept. 28, 1926.

W. J. BLOCK

HORSE COLLAR ATTACHMENT

Filed Dec. 18, 1925

1,601,608

W. J. Block, INVENTOR.

BY

Geo. P. Kimmel, ATTORNEY.

Patented Sept. 28, 1926.

1,601,608

UNITED STATES PATENT OFFICE.

WILLIAM J. BLOCK, OF BROADLANDS, ILLINOIS.

HORSE-COLLAR ATTACHMENT.

Application filed December 18, 1925. Serial No. 76,208.

This invention relates to the class of harness and pertains particularly to hame strap supports.

The primary object of this invention is the provision, in a manner as hereinafter set forth, of a device designed to have the hame strap passed therethrough and to rest upon the neck of a horse, to prevent the collar from dragging upon the top of the animal's neck.

It is well known that horses' collars often rub and make bad sores upon the top of the neck of the animal and this invention contemplates the provision of a pair of members designed to have the collar hame strap passed therethrough, which members are formed to fit against the horse's neck one upon each side of the top thereof so that when the hame strap is drawn tightly across the top of the collar, the top of the neck will be relieved of some of the collar weight and the connecting portion of the collar will rest lightly upon the top of the horse's neck.

The invention has for a final object the provision, in a manner as hereinafter set forth, of a hame strap attachment which will be light in weight, strong and durable, efficient for the purpose described and inexpensive to manufacture.

The invention will be best understood from a consideration of the following detailed description taken in connection with the accompanying drawing forming a part of this specification, with the understanding that the invention is not confined to any strict conformity with the showing of the drawing but may be changed and modified so long as such changes and modifications mark no material departure from the salient features of the invention as expressed in the appended claims.

In the drawing:—

Figure 1:
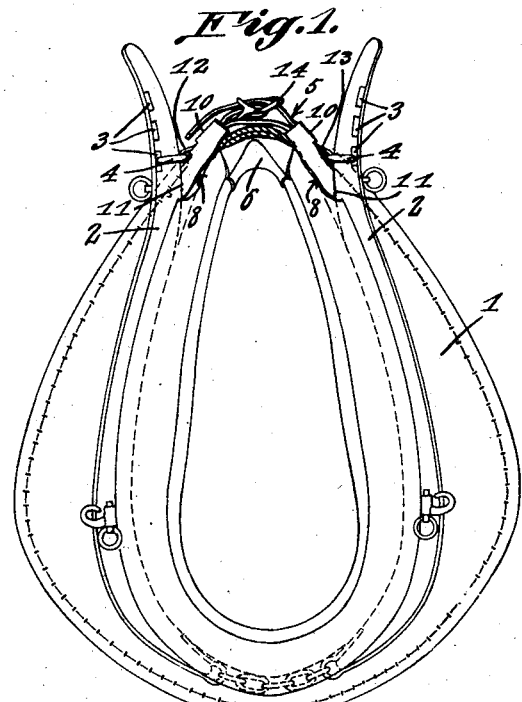
Figure 1 shows a horse collar showing the device embodying this invention applied to the hame strap thereof.

Referring now to the drawing in detail wherein like numerals of reference indicate corresponding parts throughout the several views, the numeral 1 indicates a conventional type of horse collar with the usual hames 2 attached thereto. The hames 2 each have at their upper ends the notches 3 in which notches the hame strap links 4 engage, as shown in Figure 1.

The hame strap, indicated generally by the numeral 5 connects between the links 4 across the top portion 6 of the collar 1 and when the strap is drawn tight the upper ends of the hames are drawn inwardly and the collar securely held upon the neck of the animal to which it is applied. Under the ordinary conditions the portion 6 of the collar rests directly upon the top of the animal's neck and this portion very often causes a sore to form which, of course, is very painful to the animal.

Figure 2:
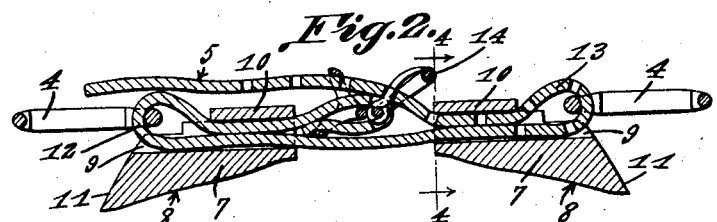
Figure 2 is a central longitudinal section taken through the hame strap and through the device embodying this invention.
Figure 3:
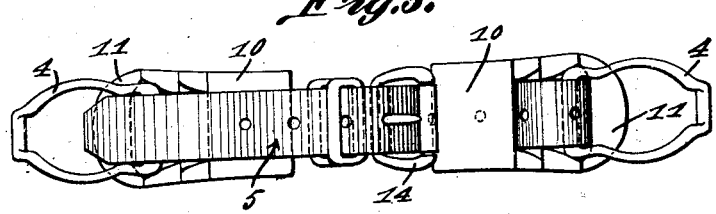
Figure 3 is a top plan view of the device embodying this invention applied to a hame strap and, Figure 4 is a transverse section taken upon the line 4—4 of Figure 2.
Figure 4:
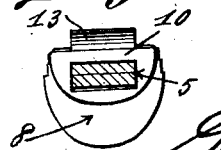

The device embodying this invention is formed of two portions each indicated as a whole by the numeral 7. These two portions or members are substantially semi-circular channelled members having the semi-circular underfaces 8 and the longitudinally channelled portion 9 in the top thereof. Overlying substantially one-half of the channel 9 at the inner end of each member, which inner ends are in opposed relation when the device is set up as shown in Figure 2, is a connecting bridge 10. The outer portion of the channels of each member is open over the top as shown.

As will be seen upon reference to Figure 2, each of the bodies 7 is of increasing thickness from the inner end to the outer portion thereof, the lowermost portion of the curved face 8 sloping outwardly and downwardly from the inner end of the body as shown, the outer end of each body tapering off in the broad tongue portion 11. These sloping semi-circular faces 8 of the blocks or body members 7 of the device, are adapted to rest against the side of a horse's neck, with the inner ends thereof in spaced relation as shown in Figures 1 and 2. The hame strap 5 has the free end thereof first passed through the passage 9 beneath the bridge portion 10 of one of the members whereupon one of the links 4 has the end of the strap extended therethrough and this free end is then passed back beneath itself and the bridge member 10, setting up a loop portion such as that indicated at 12, for the adjacent link 4. This free tongue is then extended across to the inner end of and through the passage beneath the bridge 10 of the other member 7 and after being passed through the passage, the other link 4 has the end of the strap passed therethrough whereupon this same end is then passed back again through the last mentioned passage 9 and beneath the bridge 10 thereof whereupon it is connected to the buckle 14 and secured in this position. The other link member 4 is thus held in a loop 13 of the strap as shown and the buckle 14 is arranged between the opposed inner ends of the members 7.

When the links 4 are engaged over the ends of the hames 2 as shown in Figure 1, and the tongue of the strap 5 drawn tight through the buckle 14, the members 7 of the device embodying this invention will be drawn downwardly in the position shown in Figure 1 upon either side of the neck of the animal upon which the collar is placed, and will thus relieve the pressure of the collar connecting portion 6 from the animal's neck to relieve the top of the neck of the strain which it ordinarily must take when the animal is pulling.

From the foregoing description it will be readily seen that the device embodying this invention will enable an animal to wear its collar with greater ease and without the danger of having a sore formed upon its neck at the top thereof.

Having thus described my invention what I claim is:—

1. A hame strap attachment, comprising a pair of members each having a longitudinal passage therethrough for the passage of a hame strap, each member adapted to be arranged in spaced end opposed relation on said strap, and each member further having the underside thereof inclined with respect to the top to properly position the members one on each side of an animal's neck.

2. A hame strap attachment, comprising a pair of members of substantially semi-circular cross section, each having a longitudinal passage in the upperside thereof, and a bridging portion overlying the rear of the passage in each member, said passages being adapted for the extension therethrough of the hame strap, in such a manner as to set up link engaging loops at the outer ends of the passages with the connected ends of said hame strap lying between the spaced inner ends of said members, said members being of increasing thickness from the inner to the outer ends thereof and each having its underside sloping downwardly and outwardly, to properly position the members one on each side of an animal's neck.

In testimony whereof, I affix my signature hereto.

WILLIAM J. BLOCK.